(12) United States Patent
Matsuura (10) Patent No.: US 6,757,225 B2
(45) Date of Patent: Jun. 29, 2004

(54) METHOD OF PERFORMING DATA-RECORDING OR DATA-READING WITH OPTICAL STORAGE MEDIUM

(75) Inventor: Michio Matsuura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 305 days.

(21) Appl. No.: 10/093,718

(22) Filed: Mar. 8, 2002

(65) Prior Publication Data

US 2003/0043716 A1 Mar. 6, 2003

(30) Foreign Application Priority Data

Aug. 31, 2001 (JP) ........................................ 2001-264363

(51) Int. Cl.$^7$ ................................................ G11B 7/00
(52) U.S. Cl. .............................. 369/44.23; 369/44.27; 369/44.41; 369/53.23
(58) Field of Search .......................... 369/44.11, 44.12, 369/44.23, 44.25, 44.27, 44.28, 44.29, 44.32, 44.34, 44.41, 47.1, 53.1, 53.22, 53.23

(56) References Cited

U.S. PATENT DOCUMENTS 5,889,748 A * 3/1999 Shimano et al. ........ 369/112.26
6,518,555 B1 * 2/2003 Kikuchi et al. .......... 250/201.5

FOREIGN PATENT DOCUMENTS

JP   10-200984   1/2000
JP   11-303758   5/2001

* cited by examiner

*Primary Examiner*—Muhammad Edun
(74) *Attorney, Agent, or Firm*—Greer, Burns & Crain, Ltd.

(57) ABSTRACT

A method is provided for performing data-writing or data-reading with an optical data storage medium including a substrate. The method includes the following steps. The storage medium is irradiated with light from a light source via an objective lens, so that a light spot is formed on the storage medium. Then, the lens is moved from the focus point to a predetermined defocus point where the light spot has a maximum peak intensity. The defocus point is detected as a minimum depletion point regarding the aberration caused by a thickness error of the substrate.

7 Claims, 9 Drawing Sheets

Division Pattern for Defocus Signal    Division Pattern for Thickness Error Signal

FIG.2B

Division Pattern for Compensated Defocus Signal

FIG.3C Defocus=−0.5 μm

FIG.3D Defocus=−0.75 μm (M.D.Point)

FIG.3E Defocus=−1.0 μm

FIG.3A Defocus=0 μm

FIG.3B Defocus=−0.25 μm

FIG.4A
Defocus=0 μm

FIG.4B
Defocus=−0.25 μm

FIG.4C
Defocus=−0.5 μm

FIG.4D
Defocus=−0.75 μm

FIG.4E
Defocus=−1.0 μm

— Defocus (+)
—·— Larger Thickness
—--— Smaller Thickness

FIG.9A

After Defocus Control

FIG.9B

After Thickness Error Control

METHOD OF PERFORMING DATA-RECORDING OR DATA-READING WITH OPTICAL STORAGE MEDIUM

BACKGROUND OF THE INVENTION

1. Field of the Invention

The present invention relates to a method of performing a data-recording and/or data-reading operation with respect to an optical storage disk. In this specification, an "optical storage disk" may refer to, unless otherwise specified, any type of data storage medium with which desired information is written or read optically. For instance, the optical storage medium may be a read-only disk, magneto-optical disk or phase change optical disk.

2. Description of the Related Art

One way to improve the data storage capacity of an optical disk is to increase the data recording density of the disk. A higher storage density may be achieved by making smaller the laser spot formed on the optical disk in recording data or reading data. Typically, the laser beam emitted from a light source is passed through an objective lens unit before it strikes upon the recording layer of the storage disk. As passing through the lens unit, the laser beam converges to make a small light spot on the storage disk. The storage disk may include a transparent substrate upon which a recording layer is formed. The laser beam emitted from a light source may be arranged to pass through the transparent substrate and then strike upon the recording layer. As known in the art, the diameter of the light spot increases in proportion to $\mu/NA$, where $\mu$ is the wavelength of the laser beam and NA is the numerical aperture of the objective lens. As seen from this formula, the wavelength of the laser beam should be shorter, or the NA of the lens unit should be higher (or both) in order to make smaller the light spot.

However, the reduction of the wavelength (shorter than 400 nm for example) increases the laser beam energy. This is disadvantageous because the properties of the optical components incorporated in the disk apparatus may be damaged due to the high energy. In addition, a laser beam of a shorter wavelength is readily absorbed as passing through the transparent substrate of the storage disk. As a result, the reflection light of a shorter wavelength may fail to provide appropriately strong information signals. In light of these, a laser beam whose wavelength is shorter than 400 nm is not suitable for size reduction of the light spot.

When the NA increases, on the other hand, the data-processing operation may suffer large spherical aberration. As known in the art, the spherical aberration caused by the thickness error of the disk substrate increases in proportion to the thickness error with a factor of the 4th power of the NA of the lens. Unfavorably, the occurrence of spherical aberration produces an out-of-focus laser spot, as in the case where the objective lens is "defocused." (In this specification, "defocus" is used for describing the positional deviation of the objective lens from a prescribed point along the optical axis of the lens.) Therefore, when a high NA is desired, it is necessary to prevent spherical aberration from occurring due to the thickness error of the disk substrate.

JP-A-2000-21014 teaches that an objective lens is moved along the optical axis of the lens to cope with both the aberration caused by the defocusing of the lens and the aberration caused by the thickness error of the disk substrate. According to the disclosed method, a compensation signal to move the objective lens is generated based on the detection of interference rays contained in the reflection light from the storage disk. The disclosed light interference occurs by the interaction of 0-order diffracted rays (whose incident angle is equal to its reflection angle) with 1-order diffracted rays (whose incident angle is smaller than its reflection angle).

Figure 8:
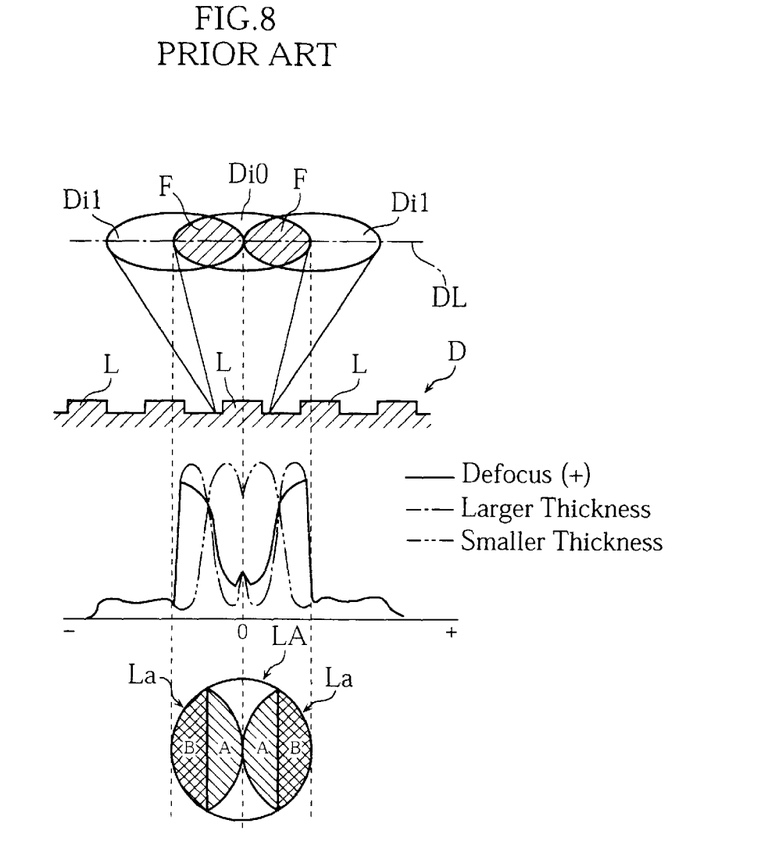
FIG. 8 and FIGS. 9A~9B illustrate conventional focus error control.
Figure 10A:
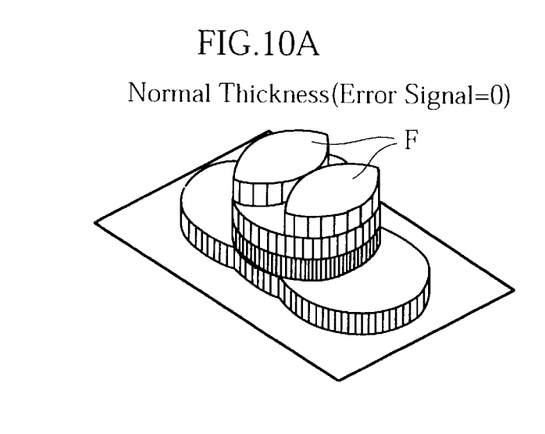
FIGS. 10A~10C illustrate diffraction patterns depending on variations in thickness of the transparent substrate of a storage disk.

Referring to FIG. 8 of the accompanying drawings, when the data-storing lands L of the disk D are irradiated by a laser beam, 0-order diffracted rays Di0 and 1-order diffracted rays Di1 will appear. As illustrated in the figure, these diffracted rays partially interfere with each other (see the hatched area F). When the substrate thickness of the storage disk D is normal, the intensity of the interference light (as measured in the hatched area F) exhibits no variation, as shown in FIG. 10A. When the substrate thickness is not normal (namely, unduly small or large), the light intensity in the hatched areas F is not uniform (see FIGS. 10B and 10C), and spherical aberration occurs.

Figure 10B:
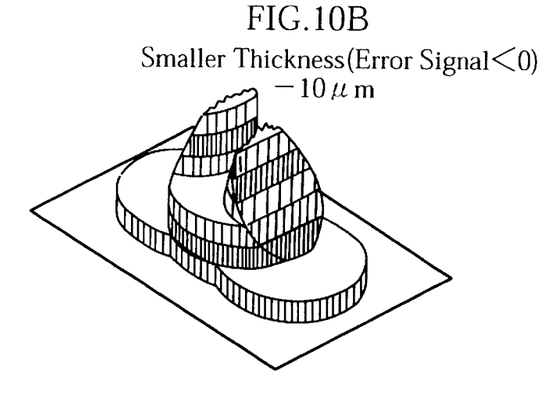
Figure 10C:
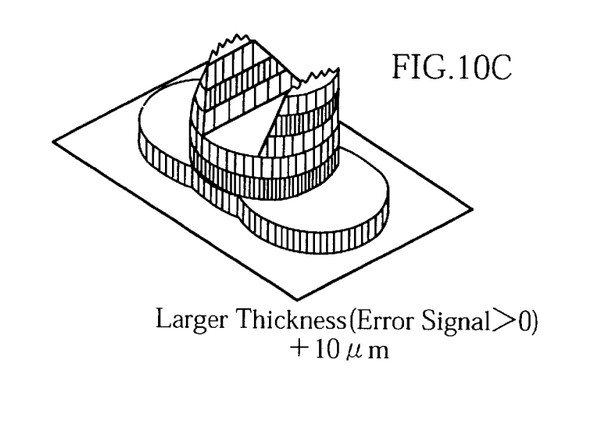

The same problem is encountered when the objective lens is defocused. Specifically, when the objective lens is deviated negatively (that is, the distance between the objective lens and the disk D is too small), a pattern as shown in FIG. 10B is observed. When the lens is deviated positively (i.e., the distance between the lens and the disk D is too large), a pattern as shown in FIG. 10C is observed. As seen from the graph in FIG. 8 (the graph shows light intensity variations measured along the single-dot chain line DL), the light intensity varies in a similar manner for both a case where the objective lens is positively defocused and a case where the disk substrate has an unduly large thickness. Though not depicted, the light intensity curve for the negative lens defocus exhibits a similar variation to that of the light intensity curve for the disk substrate having an unduly small thickness.

The circular figure LA (the lowest illustration) in FIG. 8 shows the layout of light-receiving sections of an optical detector disclosed in the above JP document (2000-21014). Based on the detected intensity of interference light, the detector LA generates compensation signals for the defocus of the lens and for the substrate thickness error. The detector LA is provided with two light-receiving areas La each of which is divided into two sections A and B for detection of interference light in the hatched areas F. The section A is responsible for receiving light from the inner half (i.e., the half closer to the center of the 0-order diffracted ray Di0) of the hatched area F, while the section B is responsible for receiving light from the outer half (i.e., the other half farther from the center of the 0-order diffracted ray Di0) of the hatched area F. The compensation signal generated by the detector LA corresponds to the difference between the light intensity $I_A$ detected by the section A and the light intensity $I_B$ detected by the section B. It should be noted here that the prior art compensation signal is generated without distinguishing the light intensity variation stemming from the lens defocusing and the light intensity variation stemming from the thickness error of the disk substrate. When the disk substrate has an unduly large thickness or the objective lens is positively defocused, the light intensity in the hatched area F becomes greater in an outer part of the area F. Thus, in this case, the compensation signal becomes negative (−). On the other hand, when the disk substrate has an unduly small thickness or the objective lens is negatively defocused, the compensation signal becomes positive (+). In accordance with the polarity and magnitude of the compensation signal, the objective lens may be moved along the optical axis toward or away from the storage disk, so that the compensation for the lens defocus and the substrate thickness error is made.

Figure 9A:
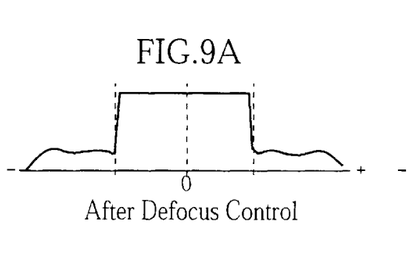
Figure 9B:
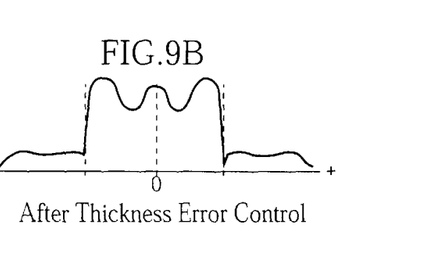

In the above method, the objective lens is moved along its optical axis for making the compensation. In this manner, while the intensity variation caused by the defocusing of the objective lens can be corrected (see FIG. 9A), the intensity variation caused by the thickness error of the disk substrate may remain uncorrected (see FIG. 9B). This difference results from the non-negligible discrepancy between the intensity curve stemming from the lens defocusing (see the graph in FIG. 8) and the intensity curve stemming from the substrate thickness error. Specifically, the aberration due to the thickness error increases in proportion to the thickness variation with a factor of the 4th power of the NA, whereas the aberration due to the lens defocusing increases in proportion to the lens deviation with a factor of the 2nd power of the NA. Accordingly, the unfavorable variation of the light intensity cannot be completely eliminated. Thus, conventionally, the peak intensity of the laser spot on the storage disk fails to be sufficiently high.

The fail in providing appropriate peak intensity is disadvantageous in using a magneto-optical disk designed for implementing magnetically induced super resolution (MSR). Specifically, in an MSR disk, reproduction of the stored data is performed only at a high-temperature portion at the center of the laser spot formed on the disk. Thus, when the peak intensity is below the normally required level, the data reproduction from an MSR disk cannot be performed.

SUMMARY OF THE INVENTION

The present invention has been proposed under the circumstances described above. It is, therefore, an object of the present invention to provide a method for overcoming the conventional drawbacks due to the thickness error of the substrate of a storage disk.

According to the present invention, there is provided a method of performing data-writing/data-reading with an optical data storage medium including a substrate. The method includes the steps of: irradiating the storage medium with light from a light source via an objective lens to make a light spot on the storage medium; moving the lens from a focus point to a defocus point where the light spot has a maximum peak intensity; and detecting the defocus point as a minimum depletion point regarding aberration caused by a thickness error of the substrate.

In the above method, when some thickness error is observed in the substrate of the data storage medium, it is not the focus point of the lens but a particular defocus point (where the peak intensity of the light spot is maximized) that is designated as the minimum depletion point for the irradiation light. In this manner, it is possible to minimize the peak intensity reduction in the light spot that is caused by the thickness error of the substrate.

Preferably, the irradiation may produce a 0-order diffracted ray and a 1-order diffracted ray, wherein the 0-order diffracted ray and the 1-order diffracted ray interfere with each other to generate interference light. Based on this interference light, the detection of the minimum depletion point may be performed. Since the interference light exhibits characteristic light intensity patterns, the minimum depletion point can be properly detected.

Preferably, the interference light may be detected by an optical detector provided with a light-receiving region divided into a plurality of sections.

Preferably, the plurality of sections may detect a thickness error signal regarding the substrate in accordance with a first detection format, while also detecting a defocus signal regarding the lens in accordance with a second detection format different from the first detection format.

Preferably, the detection of the minimum depletion point may be performed based on the thickness error signal and the defocus signal.

Preferably, the method of the present invention may further include the step of predetermining a relation between the thickness error signal and the peak intensity, wherein when the lens is at the minimum depletion point, the peak intensity of the light spot is calculated based on the predetermined relation.

Preferably, the method of the present invention may further include the step of adjusting an output of the light source based on a difference between a peak intensity of the light spot detected when the substrate has a normal thickness and a peak intensity of the light spot detected when the lens is at the minimum depletion point.

With the above arrangement, the temperature in the center of the light spot can be sufficiently high. Accordingly, even the data-reading or data-writing with respect to an MSR medium can be properly performed.

Other features and advantages of the present invention will become apparent from the detailed description given below with reference to the accompanying drawings.

DETAILED DESCRIPTION OF THE PREFERRED EMBODIMENT

The preferred embodiments of the present invention will be described below with reference to the accompanying drawings.

Figure 1:
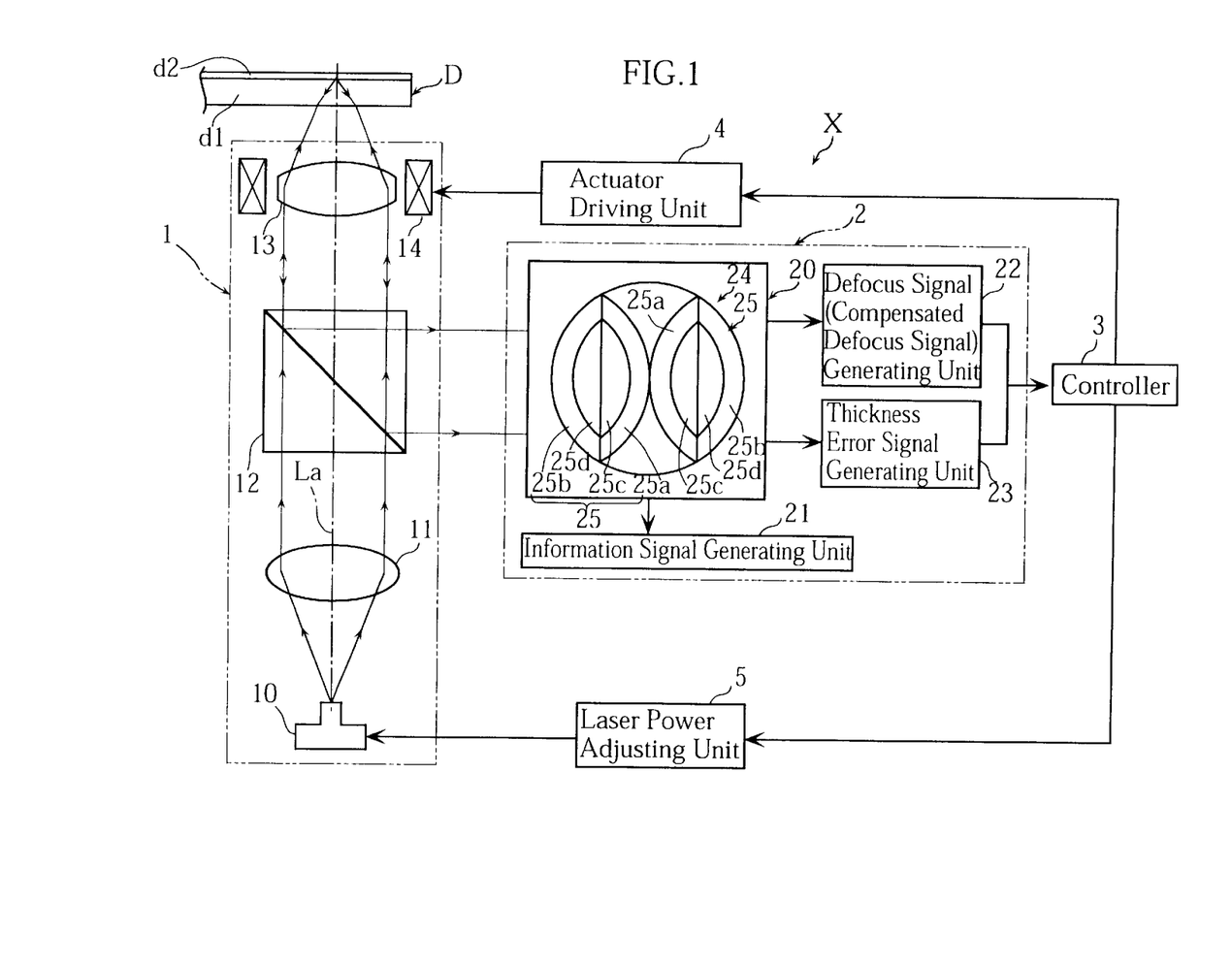
FIG. 1 shows the principal components of an optical disk apparatus used for implementing an information processing method according to the present invention.

FIG. 1 shows the principal components of an optical data processing apparatus X usable for implementing a data reproducing method embodying the present invention. The apparatus X includes an optical unit 1, a signal generator 2, a controller 3, an actuator driving unit 4 and a laser power adjusting unit 5.

The optical unit 1 includes a light source 10 for emitting a laser beam to irradiate an optical disk D. The disk D includes a transparent substrate d1 and a recording layer d2 formed on the substrate. The laser beam from the light source 10 is reflected on the recording layer d2 in a manner to be described below. The reflection light from the disk D is inputted into a light detector 20 of the signal generator 2. In addition to the light source 10, the optical unit 1 includes a collimating lens 11, a half mirror 12, an objective lens 13 and an actuator 14. As shown, the light source 10, the collimating lens 11, the half mirror 12 and the objective lens 13 are aligned along an axis La.

Figure 2A:
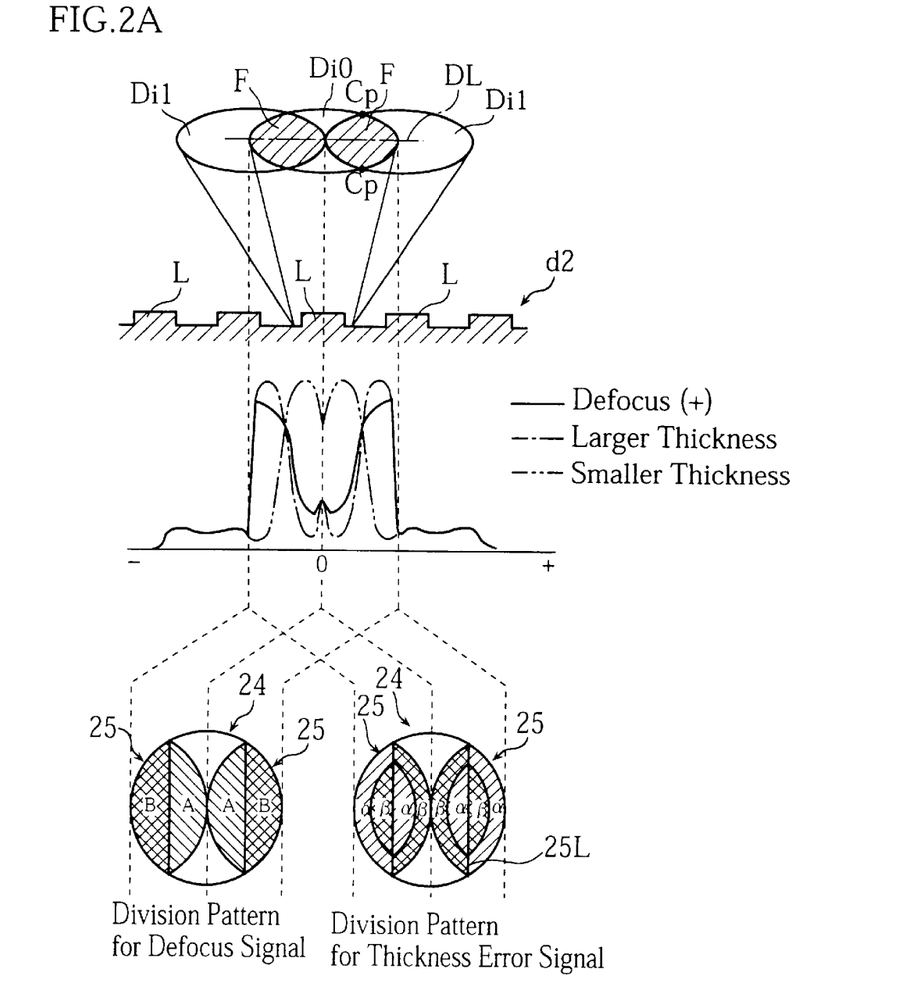
FIG. 2A illustrates the interference among diffracted rays, and division patterns for calculation of a defocus signal and a thickness error signal.

The light source 10 may incorporate a laser diode (LD). The laser rays emitted from the light source 10 are made parallel by the collimating lens 11. The half mirror 12 passes the laser beam from the light source 10 toward the objective lens 13, while also reflecting the reflection light from the disk D toward the light detector 20. The objective lens 13 converges the laser beam from the light source 10 so that a required light spot is made on the recording layer d2 of the disk D. In the illustrated embodiment, the converging laser beam first enters the transparent substrate d1 and then strikes upon the recording layer d2. As shown in FIG. 2A, the recording layer d2 is provided with a plurality of lands L upon which information is recorded. The actuator 14 (FIG. 1) reciprocates the objective lens 13 along the axis La.

In addition to the optical detector 20, the signal generator 2 includes an information signal generating unit 21, a defocus signal generating unit 22 and a thickness error signal generating unit 23.

The optical detector 20 may be composed of photoelectric converters. The detector 20 includes a circular region 24 for receiving light. Based on the amount of the received light, the information signal generating unit 21 generates information signals corresponding to the data stored in the disk D. The light-receiving region 24 includes two sub-regions 25 for receiving interference light, as described in detail below.

Referring to FIG. 2A, when the laser beam irradiates the data-recording land L of the disk D, the reflection light will produce a 0-order diffracted ray Di0 and 1-order diffracted rays Di1. For the 0-order diffracted ray Di0, the incident angle and reflection angle are equal to each other. For the 1-order diffracted rays Di1, the reflection angle is greater than the incident angle. Due to the difference between the reflection angles, the diffracted rays Di0 and Di1 interfere with each other (see the hatched areas F in the figure). The interference light (with the hatched areas F circumscribed) is received by the optical detector 20. As seen from FIG. 2A, each sub-region 25 of the optical detector corresponds in shape to the hatched area (interference area) F. More specifically, the sub-region 25 has a shape made when two circles overlap. In the illustrated embodiment, one circle stems from the 0-order diffracted ray Di0, while the other circle stems from the 1-order diffracted ray Di1. As best shown in FIG. 1, each sub-region 25 is divided into first~fourth sections 25a, 25b, 25c and 25d. Each of the four sections 25a~25d outputs a detection signal in accordance with the amount of received light. In each sub-region 25, the central borderline 25L coincides with the line connecting two cross points Cp of the hatched area F. Further, the borderline between the first section 25a and the third section 25c may be an arc whose center coincides with the center of the 1-order diffracted ray and whose radius of curvature may be 83% long of the radius of the 1-order diffracted ray. The borderline between the second section 25b and the fourth section 25d may also be an arc whose center coincides with the center of the 0-order diffracted ray and whose radius of curvature may be 83% long of the radius of the 0-order diffracted ray.

As seen from FIG. 2A, the first and the second sections 25a, 25b receive light coming from the marginal portions of the hatched area F, while the third and the fourth sections 25c, 25d receive light coming from the central portions of the hatched area F. The reason why the sub-region 25 is divided is as follows. As described above with reference to FIGS. 8–10, when the focus of the lens system is not properly adjusted (due to the positional deviation of the lens 13 or thickness error of the transparent substrate of the disk), the amount of light coming from the peripheral portions of the hatched area F exhibits characteristic variations. Thus, by detecting the characteristic light distribution, it is possible to distinguish the defocus caused by the displacement of the lens 13 along the optical axis from the defocus caused by the thickness error of the transparent substrate.

The defocus signal generating unit 22 (FIG. 1) generates a signal corresponding to the extent of the defocus resulting from the axial displacement of the objective lens 13. In the defocus signal generating unit 22, a defocus signal is generated based on information about the difference between the intensities of received light. One of them is the intensity of light received by the area A consisting of the first and the third sections 25a and 25c, while the other is the intensity of light received by the area B consisting of the second and the fourth sections 25b, 25d. According to the present invention, the defocus signal generating unit 22 may be replaced by a compensated defocus signal generating unit to be described below.

The thickness error signal generating unit 23 generates a signal corresponding to the error in the thickness of the disk D. In the unit 23, a thickness error signal is generated based on information about the difference between the intensities of received light. One of them is the intensity of light received by the areas α consisting of the second and the third sections 25b, 25c (FIG. 2A), while the other is the intensity of light received by the areas □ consisting of the first and the fourth sections 25a, 25d.

The controller 3 performs calculations based on the defocus signal and the thickness error signal mentioned above. Then, in accordance with the calculation results, the controller 3 controls the actuator driving unit 4 and the laser power adjusting unit 5. When some thickness error is detected in the transparent substrate d1, the controller 3 determines a particular defocus point as a "minimum depletion point", where the peak intensity of the laser spot on the disk D is maximized.

The actuator driving unit 4 operates the actuator 14 in accordance with signals from the controller 3. As a result, the objective lens 13 is moved along the optical axis La toward or away from the disk D. The laser power adjusting unit 5 adjusts the output of the light source 10 in accordance with signals from the controller 3. This output adjustment is performed in accordance with a pre-obtained "TES-PI" relation at the minimum depletion point ("TES" stands for thickness error signal; "PI" stands for peak intensity). More specifically, the controller 3 detects a thickness error signal at the minimum depletion point. Then, the adjusting unit 5, supplied with the detection signal from the controller 3, determines an appropriate peak intensity corresponding to the detected signal based on the TES-PI relation. After this determination, the adjusting unit 5 controls the light source 10 so that a laser beam having the calculated peak intensity is emitted.

FIGS. 3A~3E show the intensity variations of light detected by the optical detector 20 when the thickness error of the transparent substrate of the disk D is 10 □m. FIGS. 4A~4D show the intensity variations of light irradiating the disk D. For these figures again, the thickness error of the transparent substrate of the disk D is 10 □m.

Figure 3A:
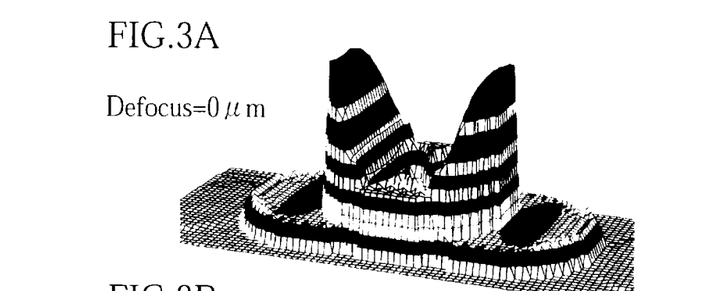
FIGS. 3A~3E illustrate several patterns of light amount distribution of the light received by the optical detector of the disk apparatus shown in FIG. 1, wherein the thickness error of the storage disk substrate is 10 □m.
Figure 3B:
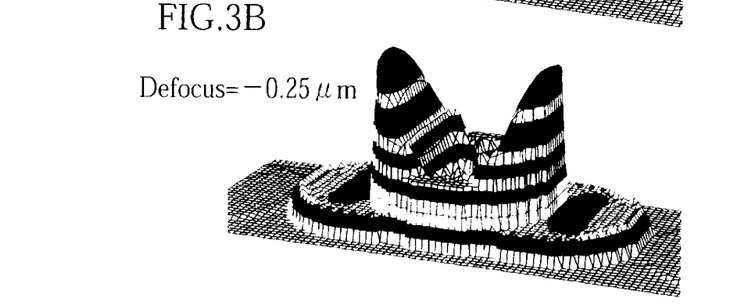
Figure 3C:
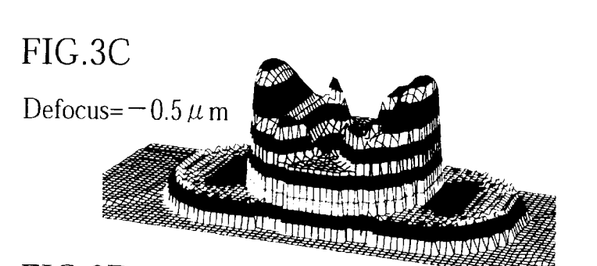
Figure 3D:
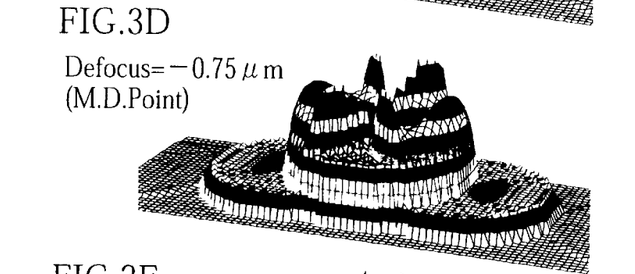
Figure 3E:
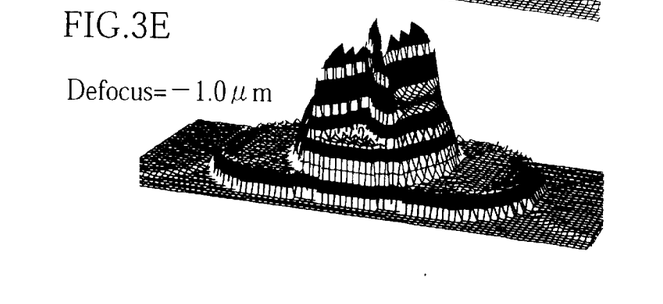
Figure 4A:
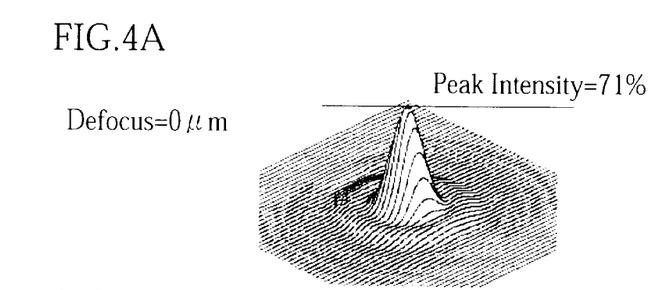
FIGS. 4A~4E illustrate several patterns of light amount for irradiating a storage disk, wherein the thickness error of the storage disk is 10 □m.

As seen from FIG. 3A, even when the defocus is 0 □m, the thickness error of the disk substrate gives rise to an uneven light distribution in the interference area F (FIG. 2F). In this case, as shown in FIG. 4A, the peak intensity of the laser spot on the disk D is 71% of the "theoretical maximum peak intensity" which is attained when there is neither lens deviation along the axis La nor thickness error of the disk substrate.

As the objective lens 13 is brought closer to the disk D along the axis La ("negative defocus"), the light distribution pattern varies as shown in FIGS. 3B~3E. In this process, when the defocus becomes −0.75 □m (FIG. 3D), the distribution pattern shows a plurality of radially extending ridges, which is a characteristic feature that has not been observed in the cases of FIGS. 3A~3C.

Figure 4B:
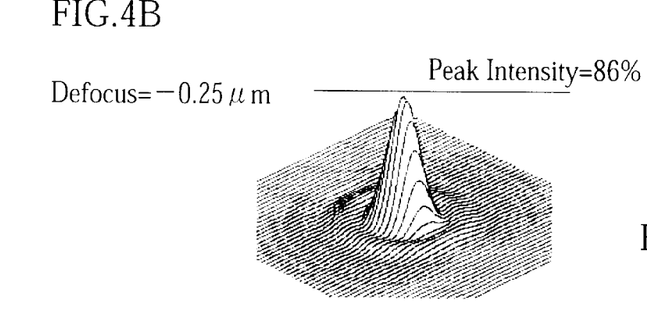
Figure 4C:
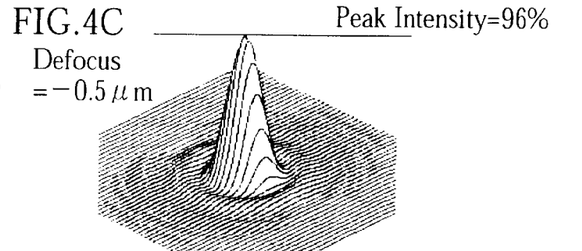
Figure 4D:
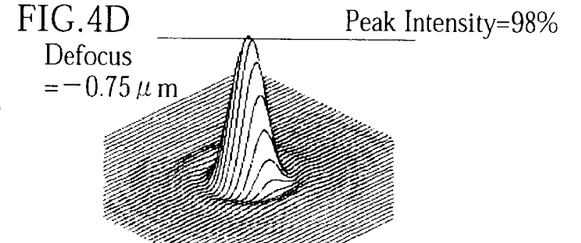
Figure 4E:
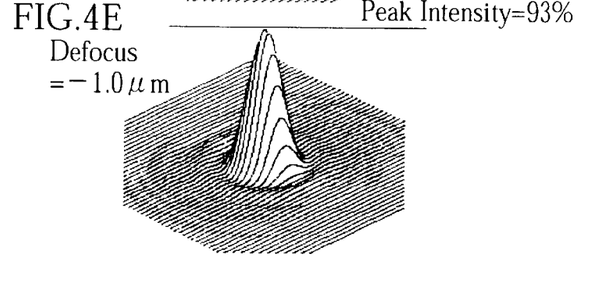

Referring to FIGS. 4B~4D, as the defocus becomes negatively greater (i.e., the lens 13 is moved closer to the disk D), the peak intensity of the laser spot formed on the disk D becomes greater. The peak intensity attains the maximum value when the defocus is −0.75 □m. This particular defocus point is designated as the "minimum depletion point." Thereafter, the peak intensity becomes smaller (FIG. 4E).

As noted above, the light distribution observed when the objective lens is in the minimum depletion point (FIG. 3D) exhibits several characteristic ridges. In a case where this particular pattern is obtained, the amount of light received by the first section 25a can be equal to the amount of light received by the second section 25b by adjusting the ratio of the areas of the first and the second sections 25a and 25b.

Figure 2B:
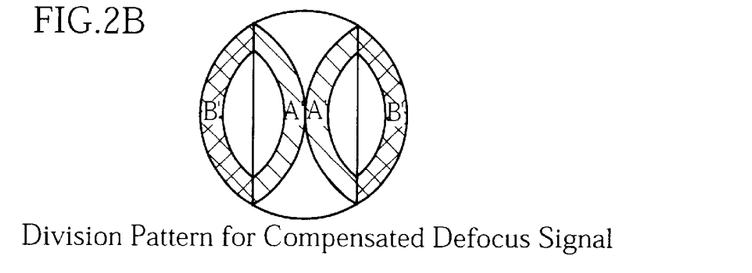
FIG. 2B shows a division pattern for calculation of a compensated defocus signal.

As seen from the comparison between FIG. 2A and FIG. 2B, the difference between the defocus signal and the thickness error signal is equivalent to a "compensated defocus signal" which is defined as the difference between the amount of light received by the areas A' and the amount of light received by the areas B' (FIG. 2B). As readily seen, the area A' corresponds to the first section 25a, while the area B' corresponds to the second section 25b. As noted above, at the minimum depletion point, the difference between the defocus signal and the thickness error signal can be zero by adjusting the areas of the first and the second sections 25a, 25b. In this instance, the compensated defocus signal can also be zero. According to the present invention, the minimum depletion point can be determined based on the compensated defocus signal. Then, the defocus signal generating unit 22 (FIG. 1) is replaced by a compensated defocus signal generating unit.

Figure 5:
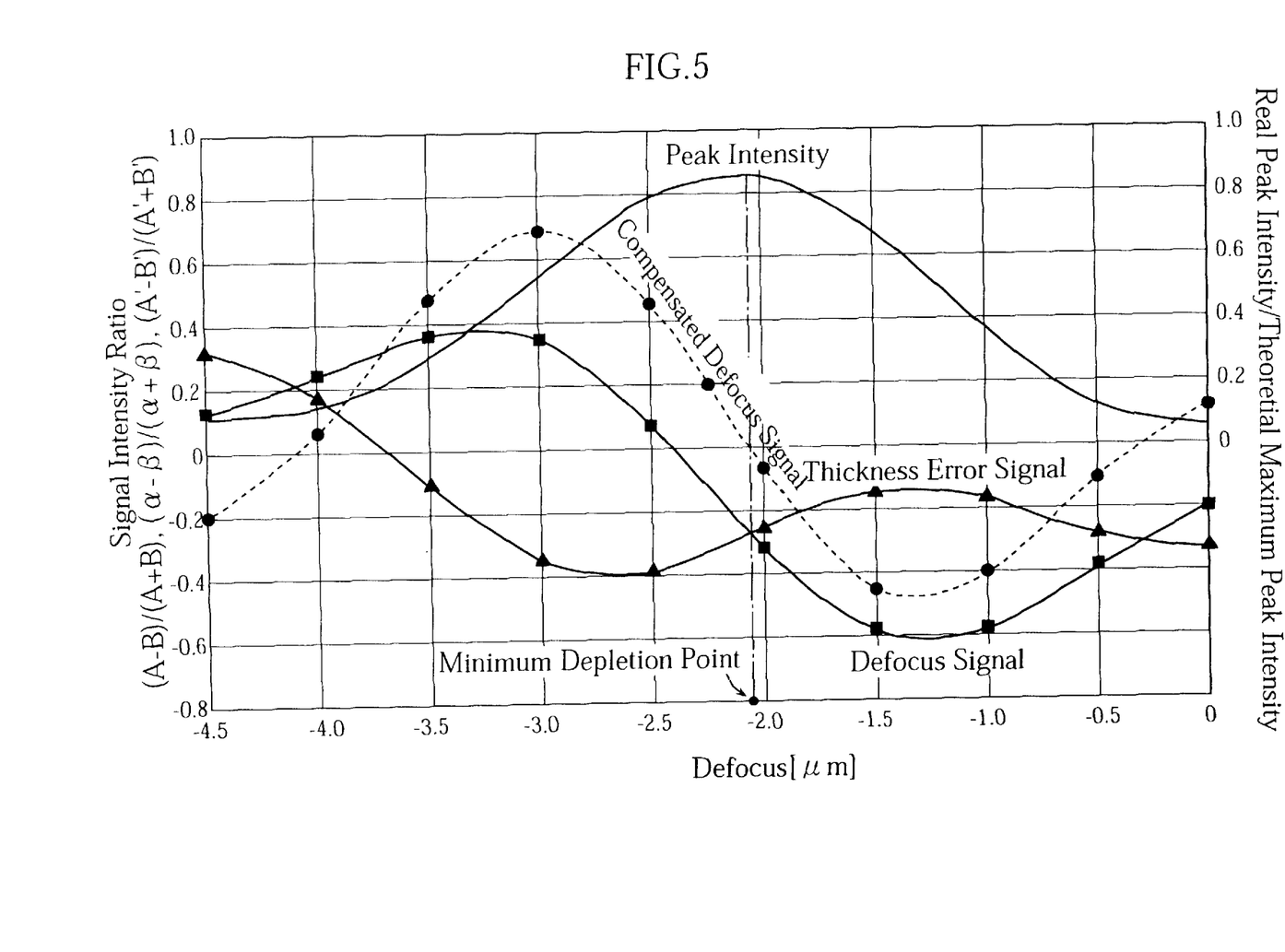
FIG. 5 shows a graph illustrating the signal and peak intensity variations with respect to the defocus amount of the objective lens.

FIG. 5 shows how the peak intensity of the laser spot varies in relation to the objective lens defocus. It also shows how the intensity of the above-mentioned signals varies in relation to the objective lens defocus. The signal intensity variation is measured by a "signal intensity ratio" which is defined as $(A-B)/(A+B)$ for the defocus signal, or $(\alpha-\square)/(\alpha+\square)$ for the thickness error signal, or $(A'-B')/(A'+B')$ for the compensated defocus signal (see FIGS. 2A and 2B). The results shown in FIG. 5 were obtained from simulations where the thickness error of the disk substrate was set to be 30 □m, the thickness of the disk substrate was 0.6 mm, the NA of the objective lens was 0.6, and the wavelength of the laser beam was 650 nm. The areas (sizes) of the first and the second sections 25a, 25b were adjusted so that the difference between the defocus signal and the thickness error signal at the minimum depletion point is zero ("zero difference point"). In this case, the compensated defocus signal is also zero.

As seen from the above, based on the combination of the defocus signal and the thickness error signal (first option) or on the compensated defocus signal (second option), the minimum depletion point can be located by detecting the zero difference point.

The laser power can be adjusted by either of the first and the second options mentioned above. To that end, however, it is necessary to depend on an appropriate parameter for determining the amount of the adjustment to be made. For such a parameter, the thickness error signal may be the best option. The reasons are as follows. First, the thickness error signal at the minimum depletion point most properly reflects the thickness error in the transparent substrate of the storage disk. Second, it is possible to know the absolute error of the substrate thickness based on the thickness error signal at the minimum depletion point. Thus, once one can obtain the relation between the thickness error signal at the minimum depletion point (which carries information about the absolute value of the thickness error in the disk substrate) and the peak intensity at the minimum depletion point, it is easy to determine the appropriate adjustment amount of the laser power.

According to the present invention, the minimum depletion point may be detected by using an equation. Specifically, the equation may be a two-variable equation whose value is specified by two parameters (variables). For the purposes of implementing the method of the present invention, one parameter may be the thickness error signal and the other may be the defocus signal. The equation should be so formulated as to give a predetermined value (zero for example) when the objective lens is brought to the minimum depletion point. Thus, by monitoring the value given from the equation, the minimum depletion point can be detected.

Referring now to FIGS. 1~6, the data processing method of the present invention will be described below in greater detail.

For reproduction of the information written to the disk D, the light source 10 emits a laser beam to irradiate the disk D. The emitted light rays from the light source 10 are made parallel in passing through the collimating lens 11. Then, the light passes through the half mirror 12 and enters the objective lens 13. After being converged by the lens 13, the laser beam will irradiate the disk D.

The laser beam passes through the transparent substrate d1 and then strikes upon the recording layer d2. After being reflected on the recording layer d2, the laser beam traces the previous path, to be reflected on the half mirror 12 toward the optical detector 20.

In the information signal generating unit 21, information reproduction is performed based on the amount of light received by the circular light-receiving region 24 of the detector 20. In the defocus signal generating unit 22, a defocus signal is generated (S1 in FIG. 6) based on the difference between the amounts (intensities) of light received by the sections A and the sections B (see FIG. 2A).

Figure 6:
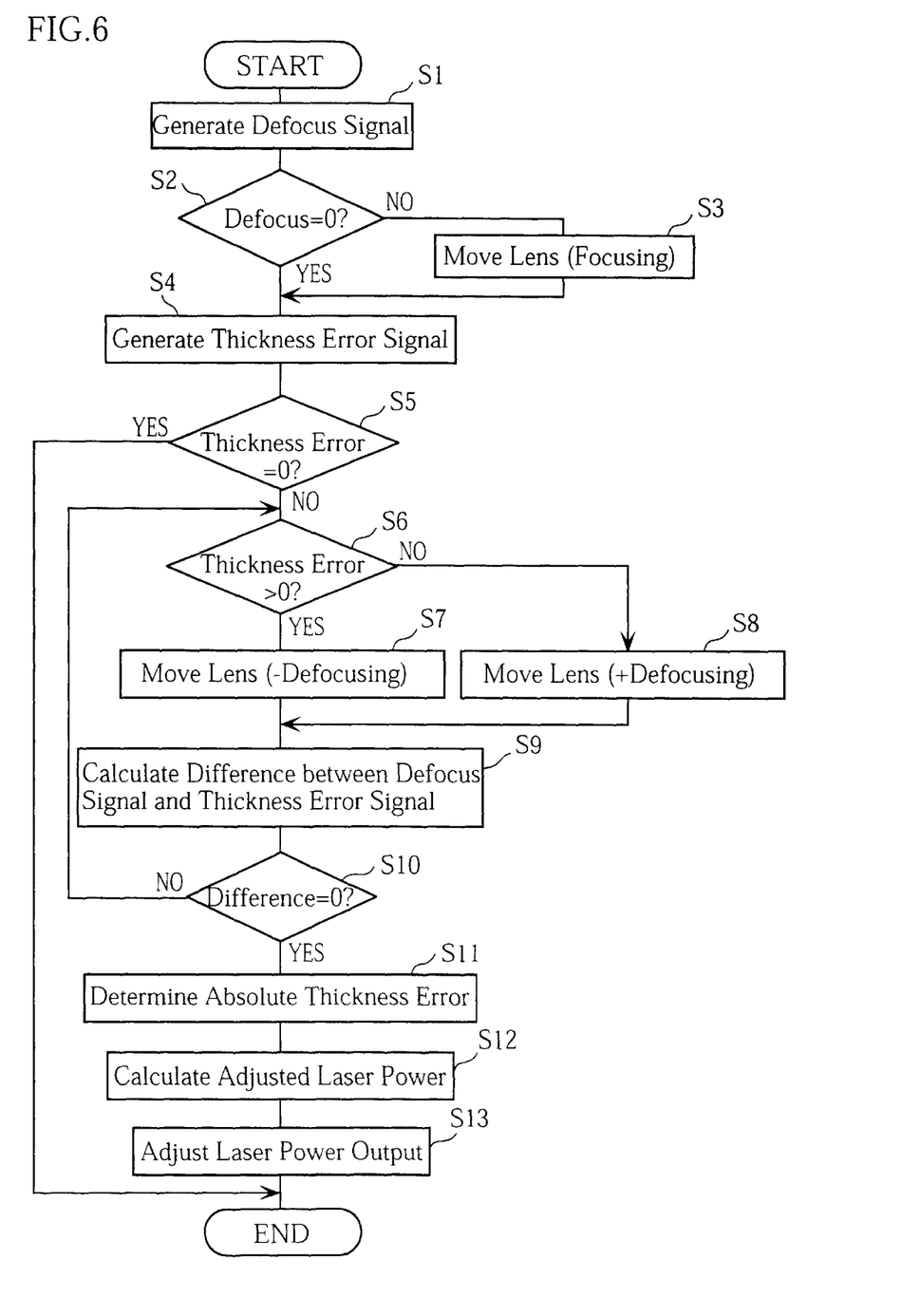
FIG. 6 shows a flow chart for describing the present invention.

In the controller 3, the defocus signal is relied upon in determining whether the defocus amount is zero (S2 in FIG. 6). When the defocus amount is not zero (S2:NO), the controller 3 sends a control signal to the actuator driving unit 4. Upon receiving the control signal, the driving unit 4 operates the actuator 14 to move the lens 13 along the axis La. In this manner, focusing control is performed (S3) to make the defocus amount equal to zero.

When the focus amount is zero (S2:YES in FIG. 6), or the lens focusing (S3) is performed, the thickness error signal generating unit 23 generates a thickness error signal (S4 in FIG. 6). As noted above, this signal is generated based on the difference between the amount of light received by the sections α (FIG. 2A) and the amount of light received by the sections □. Based on the thickness error signal, it is determined whether the thickness error in the disk substrate is zero (S5 in FIG. 6).

When the controller 3 determines that the thickness error is not zero (S5:NO in FIG. 6), the sign (+ or −) of the thickness error signal is determined (S6). The plus sign (+) indicates that the second section 25b receives more light than the first section 25a does. In this case, the thickness of the transparent substrate of the disk D is above the normal (see FIG. 10B). Thus, in this case, it is necessary to reduce the amount of light detected by the second section 25b, whereas to increase the amount of light detected by the first section 25a, until the difference in detected light between the two sections will become equal or closer to zero. To achieve this, the objective lens 13 should be moved away from the disk D for compensating the elongated optical path due to the unduly larger thickness of the transparent substrate d1. More specifically, when the thickness error is found to be positive [+] (S6:YES), the controller 3 sends a signal to the actuator driving unit 4. Accordingly, the unit 4 operates the actuator 14 so that the objective lens 13 is moved away from the disk D, or in the negative direction along the axis La (S7).

When the controller 3 determines that the thickness error is negative [−] (S6:NO), the objective lens 13 is moved in the positive direction along the axis La (S8), so that the distance between the lens 13 and the disk D decreases.

Then, the controller 3 calculates the difference between the defocus signal and the thickness error signal (S9), and determines whether the obtained difference is zero (S10). When the difference is not zero (S10:NO), the defocusing of the lens 13 is performed until the difference becomes zero.

When the controller 3 determines that the above difference is zero (S10:YES), the controller detects the current defocus point as the minimum depletion point. As noted above, in an instance where some thickness error is found in the transparent substrate of the disk D, the minimum depletion point is a point where the laser spot formed on the disk D has the maximum peak intensity.

Then, based on the thickness error signal at the minimum depletion point, the controller 3 determines the absolute thickness error in the disk substrate (S11). The adjusted laser power is calculated based on the absolute thickness error (S12). This calculation can be readily performed when the relation between the absolute thickness error and the peak intensity is known beforehand.

After the adjusted value of the laser power is calculated, the controller 3 provides the laser power adjusting unit 5 with a signal corresponding to the adjusted value. Upon receiving this signal, the adjusting unit 5 adjusts the output of the light source 10 (S13).

According to the present invention, when there is some thickness error in the disk substrate, a particular defocus point is selected for the minimum depletion point for maximizing the peak intensity of the laser spot on the disk. In this manner, it is possible to minimize the decrease of the laser irradiation due to the substrate thickness error. The detection of the minimum depletion point is performed based on the interference of light between the 0-order diffracted ray and the 1-order diffracted rays. As discussed above, the interference light exhibits characteristic distinguishable features. Thus, by detecting the defocus signal (compensated defocus signal) and the thickness error signal with the use of an optical detector whose light-receiving region is divided into appropriate sections, the minimum depletion point can be detected. After the detection of the minimum depletion point, the reduced peak intensity of the laser spot is compensated by adjusting the power of the light source. Accordingly, the temperature of the center of the laser spot can be maintained above a certain level. Thus, data-writing or data-reproducing with an MSR storage medium can be properly performed.

Figure 7A:
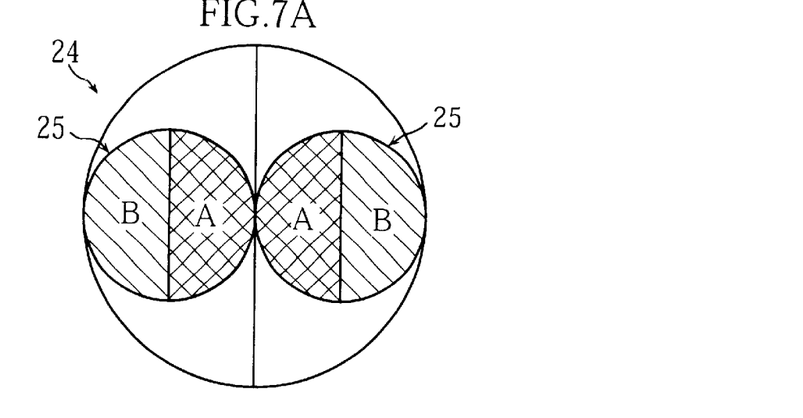
FIGS. 7A~7C show examples of division pattern for the light-receiving region of an optical detector.
Figure 7B:
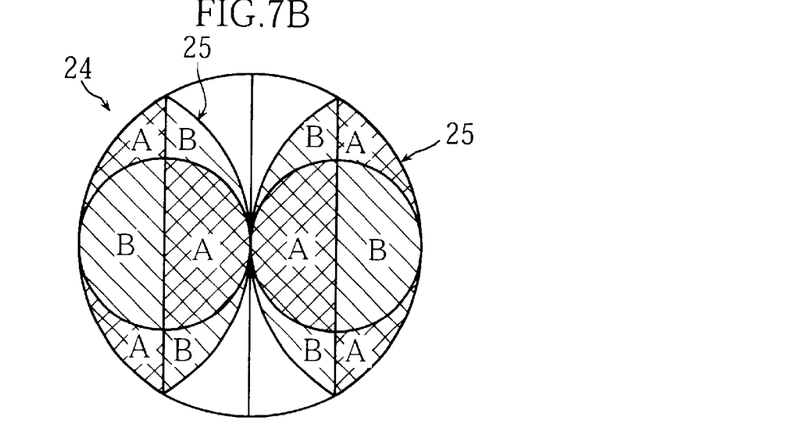
Figure 7C:
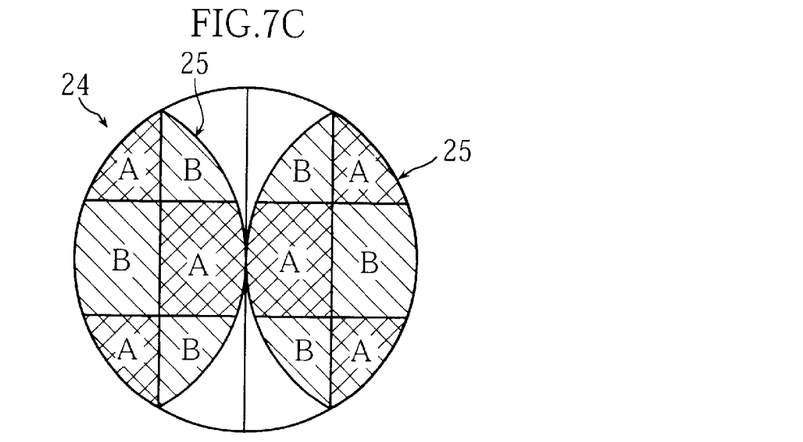

According to the present invention, any division pattern is applicable for the circular light-receiving region of the optical detector as long as the defocus signal (compensated defocus signal) or thickness error signal is properly detected. Examples of the division pattern are shown in FIGS. 7A–7C.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A method of performing data-writing/data-reading with an optical data storage medium including a substrate, the method comprising the steps of:

irradiating the storage medium with light from a light source via an objective lens to make a light spot on the storage medium;

moving the lens from a focus point to a defocus point where the light spot has a maximum peak intensity; and detecting the defocus point as a minimum depletion point regarding aberration caused by a thickness error of the substrate.

2. The method according to claim 1, wherein the irradiation produces a 0-order diffracted ray and a 1-order diffracted ray, the 0-order diffracted ray and the 1-order diffracted ray interfering with each other to generate interference light based on which the detection of the minimum depletion point is performed.

3. The method according to claim 2, wherein the interference light is detected by an optical detector provided with a light-receiving region divided into a plurality of sections.

4. The method according to claim 3, wherein the plurality of sections detect a thickness error signal regarding the substrate in accordance with a first detection format, while also detecting a defocus signal regarding the lens in accordance with a second detection format different from the first detection format.

5. The method according to claim 4, wherein the detection of the minimum depletion point is performed based on the thickness error signal and the defocus signal.

6. The method according to claim 4, further comprising the step of predetermining a relation between the thickness error signal and the peak intensity, wherein when the lens is at the minimum depletion point, the peak intensity of the light spot is calculated based on the predetermined relation.

7. The method according to claim 1, further comprising the step of adjusting an output of the light source based on a difference between a peak intensity of the light spot detected when the substrate has a normal thickness and a peak intensity of the light spot detected when the lens is at the minimum depletion point.

* * * * *